United States Patent Office 3,233,983
Patented Feb. 8, 1966

3,233,983
CALCIUM CONTROL IN CRYSTALLIZATION OF SODIUM SESQUICARBONATE
William C. Bauer, Green River, Wyo., and Allen P. McCue, Norwalk, and Kenneth C. Rule, Noroton Heights, Conn., assignors to FMC Corporation, New York, N.Y., a corporation of Delaware
Filed Sept. 26, 1960, Ser. No. 75,455
9 Claims. (Cl. 23—300)

This invention relates to improvements in the method of crystallizing certain inorganic salts, particularly those containing sodium and bicarbonate ions, and more particularly sodium sesquicarbonate. This application is a continuation-in-part of our copending application Serial No. 474,828, filed December 13, 1954, now Patent No. 2,954,282.

As is well known, when the solubility of an inorganic salt in a solvent is exceeded, as by sufficiently lowering the temperature of an unsaturated solution or by introducing an excess of one or more of the ions involved, the salt is deposited in solid form. This method is perhaps the most commonly used process for the production of crystalline salts, and is exemplified in the production of sodium sesquicarbonate, where impure trona mineral is mined and purified by recrystallization from a hot, aqueous solution as described, for example, in the Pike U.S. Patent No. 2,639,217.

In many cases, the type of salt crystals obtained by such methods are of decidedly inferior quality, considering such factors as crystal shape, purity, settling rate, size, uniformity, dewaterability, resistance to breakage and bulk density. The attainment of the desired results as to these characteristics has long been a problem in the production of sesquicarbonate from trona, which product is largely converted to soda ash as the final market commodity. Inferiority of the intermediate sesquicarbonate ordinarily leads to inferiority in the final soda ash product.

It is accordingly an object of the present invention to provide a novel method for obtaining sodium sesquicarbonate of greatly improved quality.

Another object of the present invention is to provide such a method which is practical and economically feasible.

Another object of the invention is to provide a method of crystallizing sodium sesquicarbonate crystals from aqueous solutions of natural trona substantially free of calcium hardness, whereby improved crystal size and improved crystal purity is obtained.

Another object of the invention is to provide a method of crystallizing sodium sesquicarbonate from aqueous solutions of natural trona of controlled calcium content, whereby more uniform particle size soda ash may be produced.

Another object of the invention is to provide sodium sesquicarbonate crystals and soda ash made therefrom of improved clarity and freedom from calcium impurities.

Other objects and advantages of the invention will appear from a consideration of the following disclosure and the attached illustrations.

We have discovered that the shortcomings and disadvantages of the prior art methods of crystallizing sodium sesquicarbonate are largely eliminated by the use of very small concentrations of an anionic-active surface active agent and that small variations in the calcium content of the plant liquor from whcih the sodium sesquicarbonate is crystallized will substantially affect the operation of the crystal growth promoting additives. Adopting the name commonly used by chemists, surface active agents are herein called "surfactants."

The preferred types of these anionic-active surfactants are organic sulfate (organosulfate) or sulfonate (organosulfonate) derivatives, and of these preferred subclasses, the preferred sulfonates are alkyl benzene or alkyl naphthalene sulfonates wherein alkyl carbons total at least four and desirably more, and the preferred sulfates are the higher alkyl alcohol sulfates. Thus, particularly effective compounds are dodecyl benzene sulfonate and polypropylene benzene sulfonates ranging from $C_{10-18}$ alkyl groups; and dibutyl or diisopropyl naphthalene sulfonate.

Another preferred subclass, related to the foregoing preferred subclasses, are the taurates derived from N-alkyltaurine ($RNHCH_2CH_2SO_3H$) and fatty acids, containing a fatty acid residue of substantial length, i.e., at least 8 carbon atoms. Examples are sodium-N-methyl-N-lauryl taurate, sodium-N-cyclohexyl-N-palmityl taurate, sodium-N-methyl taurate of tallow acids and sodium N-methyl-N-oleyl taurate. Taurates containing lower molecular weight fatty acid substituent groups are proportionately less effective.

The primary alcohol sulfates containing alkyl groups of substantial size, such as those based on lauryl alcohol, are very effective additives. Examples are sodium, ammonium and triethanolamine lauryl sulfates. Primary alcohol sulfates containing smaller alkyl groups, e.g. on the order of only $C_8$ alkyl groups, are proportionately less effective and are not recommended. The practical upper limit is about $C_{18}$ groups. Examples in the $C_{8-18}$ range include: sodium octyl sulfate, sodium lauryl sulfate, ammonium lauryl sulfate, triethanolamine lauryl sulfate, sodium coconut alcohol sulfate, sodium tridecyl alcohol sulfate, sodium tallow alcohol sulfate, sodium cetyl sulfate and sodium oleyl sulfate.

It appears that in general the free acids of these various surfactants may be used, because they are converted to the sodium salts in the process liquors, which are mildly alkaline, and thus function the same as the soluble salts of the additives.

Cationic-active and nonionic surfactants are totally ineffective as additives in improving the crystallization of sodium sesquicarbonate. Various theories have been considered in an effort to explain the clearly established, unique effectiveness of the anionic-active surfactants—particularly the subclasses above enumerated—and the complete lack of effectiveness of the cationic and nonionic classes. In general, these theories have all failed to fully explain this unexpected result.

Up to about 100 parts per million (p.p.m.) of surfactant are recommended in the crystallization of sodium sesquicarbonate, but for various reasons the preferred concentration is about 5–20 p.p.m. Levels below 5 p.p.m. show beneficial effect, but are not the preferred concentration. Similarly, amounts in excess of 100 p.p.m. may be used with beneficial results, but complicating effects may begin to appear at excessively high levels, such as crystal twinning or branching, and contamination of the product, and the use of these higher concentrations is, of course, economically undesirable. The levels specified herein refer to the active content of the various commercial preparations available, unless otherwise noted. Small variations in the calcium content of the process liquors, however, materially change the effectiveness of the crystal growth promoting additives.

Higher levels of the surfactants were also found in general to be necessary in the sesquicarbonate laboratory testing, to accentuate differences on small scale runs. In contrast, plant scale tests showed great differences resulting from the use of surfactants, where the levels used needed to be only a few percent of those utilized in the laboratory scale runs.

In the process of refining trona to produce pure sodium sesquicarbonate as described, for example, in said Pike U.S. Patent No. 2,639,217, the surfactant is preferably introduced just ahead of the cooling and crystallization step, so that less is lost in any mother liquor discarded from the recycling system, or removed by any adsorbent used in the purification procedure.

In order to control and provide substantially uniform low calcium content in the process liquors the natural hard waters of the region must be softened to a substantially uniform degree of calcium hardness. Any method of softening the hard natural waters used in the process of producing soda ash from natural trona as found in the vicinity of Green River, Wyoming, may be used, but we prefer, for reasons of economy, to soften the hard natural waters of this region by thoroughly slurrying and washing the insoluble trona muds remaining after dissolving most of the sodium values therefrom with the natural water of the region, whereby the total hardness of the natural waters, averaging 85–120 ppm. as calcium, is reduced to about 16 ppm. and the undissolved sodium values are largely recovered.

Prior to our discovery of the beneficial effects of the use of crystal growth promoting additives, the trona process of making sodium sesquicarbonate as described, for example, in said Pike U.S. Patent No. 2,639,217 in a commercial plant was operating at only about 25–30% of the designed capacity, due to trouble in the operation of the centrifuges which separate the sodium sesquicarbonate crystals from the mother liquor.

This difficulty arose from the fact that the crystalline slurry obtained in the cooling and crystallization step had very undesirable properties. Thus, it is desirable that this slurry be rich in crystal content, and yet the crystal content cannot be so high that the slurry fails to flow properly. Also, the crystals must be of such a nature that they can be readily separated from the slurry in the centrifuges, i.e. they must settle readily and be easily dewaterable. However, none of these desirable characteristics was being obtained, and as a consequence the centrifuges were the bottlenecks in the plant operations.

Considerable effort was expended in changing operating methods which, it was believed, might have some effect upon the characteristics of the crystalline slurry or the crystals themselves, including various efforts at improving and varying the purification procedures. However, all of the extensive efforts along these lines failed and the centrifuge bottleneck continued to limit plant production to about one-fourth to one-third plant designed capacity.

The crystals continued to be very small and needle-shaped, and were agglomerated into clumps of feathery appearance. The three points in the process where their undesirable structure was especially troublesome were in the settlers, in the concentrating feeders, and in the centrifuges. Due to poor settling the net result was that a low concentration slurry was being fed into the centrifuges, which in turn delivered a poorly dewatered product at far below designed capacity rates.

Thus, typical slurries contained on the order of as little as 35–40 percent crystals by weight, and flowed very sluggishly and unevenly. The use of about 25 ppm. of one of the preferred additives gave slurries containing 50–55 percent crystals by weight which, even though containing much more solid material, pumped and flowed smoothly and evenly.

Other undesirable consequences due to the existence of this problem were fragility of the crystals, leading to excessive breakage in centrifuging; nonuniformity in particle size, excessive dustiness of the soda ash product due to fine crystals; low bulk density due to fine, feathery crystals; and an unsatisfactory degree of purity due to incomplete removal of mother liquor in the centrifuge operation.

The use of additives in the trona purification process as described, for example, in said Pike U.S. Patent No. 2,639,217 did not initially appear attractive, since it was expected that high concentrations of additives in the process liquors would be necessary at the moment of crystallization, in order to give any substantial benefit. Difficulty in this respect was anticipated because the process liquor is purified with an adsorbent and filtration just ahead of the crystallization step, and it was realized that this adsorbent would probably effectively remove any residual additive carried along in the recycled mother liquor. This meant that the additive would have to be introduced anew in all of the purified liquor going to the crystallizer, which would obviously entail a substantial additional processing cost. It was found that substantially all of the additive remaining in the mother liquors recycled to the dissolvers, was removed in the insoluble muds remaining after dissolution of the sodium values from the crude trona and that any residual additive carried along in the recycle mother liquor was removed in the adsorbent filtered from the process liquors just prior to their introduction into the crystallizers.

A review of the published work done by others indicated that a wide range of additives had been tried in various crystallization problems, but no pattern existed which would allow reliable predictions as to the type of additive which would be effective. Thus, ionic additives such as sodium nitrate and sodium chloride had been tested for their effect on the crystallization of sodium bicarbonate, while at the other extreme the effect of nonionic additives had been noted in the crystallization of other substances. As is well known, there is no generally accepted theory on the mechanism of crystallization and, as had been noted by one of the well-known chemical encyclopedias, the entire field of crystallization is highly empirical.

Numerous mechanisms have been suggested for the effects on aqueous solutions produced by the addition of a surface active agent. One theory is that a reduction in surface tension around the crystal, i.e., at the solid-liquid interface, allows easier and more rapid deposition, creating a better balance between crystal growth and nucleation. Another theory is that the additive interferes with or inhibits growth at the ends of the crystal, with the resulting tendency to produce shorter, thicker crystals instead of long, slender crystals which would subsequently break up to furnish additional nuclei. Other workers have theorized that surface tension is not a substantial factor or that, if it is, it is operative only on crystals forming at the air-liquid interface.

The various impurities naturally present in the process liquors or added during the processing affect the operation of the crystallization improving additives as is shown by the effect of the high calcium content of the natural waters on the size and purity of the sesquicarbonate crystals as hereinafter described.

The invention will be better understood from a consideration of the following examples, and a reference to the attached illustrations.

Figure 1:
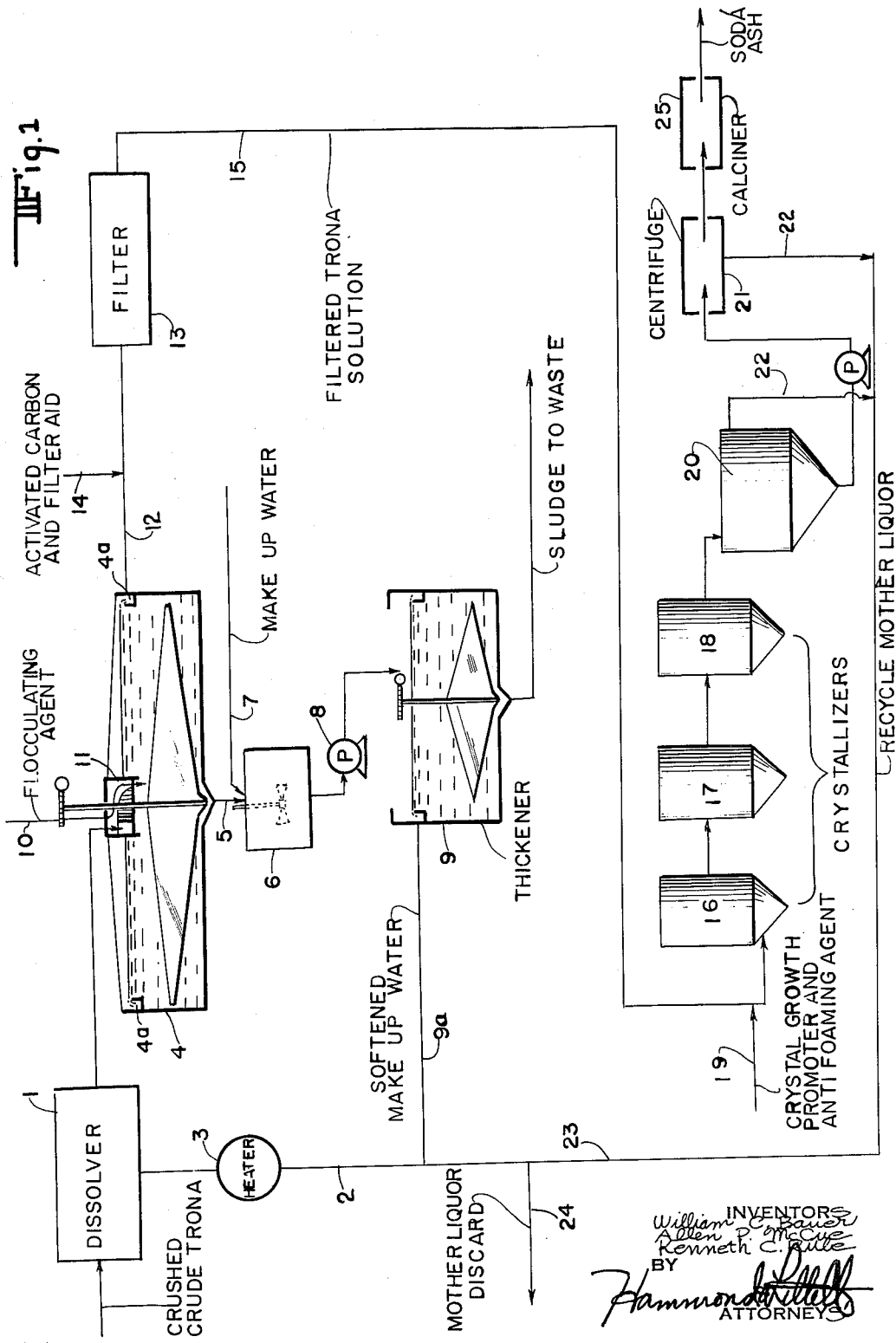
FIG. 1 is a diagrammatic flow diagram similar to that of the said Pike U.S. Patent No. 2,639,217 of the process used to produce soda ash from crude Wyoming trona, as modified according to the present invention.

As illustrated in FIG. 1 the crushed crude trona as removed from the mine is introduced into insulated dissolving tanks 1 in which it is contacted with recycling mother liquor from line 2, which has been reheated to about 100° C. in heater 3. From the dissolvers 1 the trona solution carrying insoluble material therein flows into insulated clarifiers 4 in which most of the mud and slime settles out and is removed through the underflow line 5 into a head tank 6. The mud and slime discharged from clarifier 4 is about 30 to 40% solids. Makeup water is introduced at 7 and is thoroughly mixed with the muds by pump 8 and pumped into the center of insulated thickener 9 from the bottom of which the sludge is discharged to waste and the clarified overflow, containing trona values dissolved by the makeup water, and the now softened makeup water flows through the line 9a and is added to the recycle mother liquor flowing into the heater 3. The makeup water having an average total hardness of about 120 p.p.m. calculated as calcium, in contact with the trona insolubles in thickener 9, is softened to a hardness of about 16 p.p.m. in the thickener 9 and the calcium precipitated as calcium carbonate is discharged from the system with the sludge.

In the clarifier 4 a flocculant may be introduced, through the line 10, into the feed from the dissolvers in the center well 11 of the clarifier. The flocculant is preferably introduced in just the right amount to flocculate, settle and remove the colloidally fine slime in the trona solution and be substantially completely removed with the slime. The flocculants which have been found most satisfactory are hydrophylic colloids produced from the seeds of certonia silique, certonia tetragonoloba, cyamopsis tetragonoloba and other leguminous seeds. In general all the cold water soluble gums of high viscosity prepared from guar seeds and similar synthetic materials, such as high molecular weight polyacrylamides and hydrolized polyacrylonitriles, are useful as flocculants. One desirable form of such flocculant is sold under the name "Burtonite 78" by the Burtonite Company, Nutley 10, New Jersey.

The clarified trona solution overflowing from the weir 4a of the clarifier 4, flows through the line 12 to the filter station 13. Activated carbon and a filter aid is introduced prior to filtration as indicated at 14 and after filtration the hot trona solution flows through the line 15 to the vacuum crystallizers 16, 17 and 18 where the temperature of the solution is reduced to about 45° C. to crystallize sodium sesquicarbonate therefrom. Just prior to introduction into the crystallizer system a crystallization promoter from the classes described above, and a defoaming agent is added as indicated at 19. The crystallization promoter is preferably used in amounts of 5 to 100 p.p.m. and increases the particle size of the sodium carbonate produced without a crystallization promoter from about 40% plus 100 mesh to above 70% (preferably above 80%) plus 100 mesh when a crystallization promoter is used.

From the last crystallizer the crystal slurry goes to a crystal settler 20, from which a crystal slurry is pumped to a centrifuge station 21 where the crystals of sodium sesquicarbonate are separated from the mother liquor and the mother liquor containing primarily water and dissolved sodium carbonate and sodium bicarbonate together with some calcium and other impurities overflow from the crystal settler 20 and from the centrifuges is recycled through the lines 22 and 23 to the heater 3 where it is reheated and used to dissolve more crude trona. In order to maintain the proper balance of sodium carbonate to sodium bicarbonate in the recirculating mother liquor, a portion of the recirculating mother liquor may be withdrawn and discarded, or processed in other ways to recover the soda values therein, as indicated at 24. From the centrifuge station 21 the sodium sesquicarbonate crystals are conveyed to calciners 25 where they are calcined to soda ash.

EXAMPLE 1

Figure 2:
FIG. 2 is a reflection photomicrograph of sodium sesquicarbonate crystals prepared in the laboratory without the use of a surfactant, at 10 power (10×) magnification.

Crystallizations without the use of an additive were carried out by cooling sodium sesquicarbonate plant liquor filtrate solutions which were essentially saturated with sesquicarbonate at about 90° C., and containing the usual excess of sodium carbonate. These crystallizations were effected in a 500 ml. flask nearly full of solution, the solution being agitated continuously with a stirring device. The temperature was allowed to drop to 60° C. to promote crystallization and the crystals formed were tested for settling characteristics and dewaterability. It was found desirable to paint the flask on the outside with aluminum paint so that the normal cooling time was about 60 minutes. This method of crystallization satisfied the requirements of simplicity and reproducibility. In numerous runs without the use of an additive, the settled slurry contained about 12–20 percent crystals by weight and had a dewaterability, measured by the amount of water retained in the centrifuge cake, of about 8–13 percent. These crystals are shown in Figure 2.

EXAMPLE 2

Figure 3:
FIG. 3 is a reflection photomicrograph of the rod-like sesquicarbonate crystals prepared with the use of 150 p.p.m. of dodecyl benzene sodium sulfate at the same magnification.

The procedure described in Example 1 was repeated, but this time an additive was introduced into the solution prior to cooling. The additive used was dodecyl benzene sodium sulfonate, and enough of the commercial material (Detergent D–40 or Sulfonate AA–9) was used to give a concentration of about 150 ppm. The dewaterability was improved to a value of about 3–4 percent and the settled slurry had a crysal content of about 40 percent. When this run was repeated at an additive concentration of 80 ppm., the dewaterabiilty was about 6 percent and the settled slurry contained about 35 percent crystals by weight. See Figure 3 for illustration, and note the striking improvement in comparison with Figure 2.

EXAMPLE 3

Another run similar to the foregoing example, but using butyl naphthalene sodium sulfonate (Sorbit AC, containing about 65 percent active material) likewise gave greatly improved results over Example 1, giving a dewaterability of about 4 percent and a settled slurry containing about 30 percent crystals by weight, when 330 ppm. of the commercial additive was used.

EXAMPLE 4

Another run, similar to the foregoing, was made using 400 ppm. of commercial sodium lauryl sulfate and this time a dewaterability of 3.6 percent and a settled slurry of 39 percent crystal content was obtained.

EXAMPLE 5

The laboratory use of about 380 ppm. of commercial triethanolamine lauryl sulfate gave a dewaterability of 3.1 percent and a 35 percent crystal content settled slurry.

EXAMPLE 6

The laboratory use of 375 ppm. of sodium-N-cyclohexyl-N-palmityl taurate (Igpeon CN–42 containing 28 percent active material) gave crystals with a dewaterability of 3.6 percent and a settled slurry of 39 percent crystal content.

EXAMPLE 7

The use of 140 ppm. of sodium-N-methyl-N-oleyl-taurate (Igepon T–77, containing 72 percent active material) gave a dewaterability of about 4 percent and a settled slurry of about 37 percent crystal content, in small scale trials.

EXAMPLE 8

Figure 4:
FIG. 4 shows sesquicarbonate crystals prepared on a plant scale without the use of additives, at 10 power (10×) magnification.

The troubles encountered in the operation of the plant process for the production of crystalline sesquicarbonate as illustrated diagramatically in Figure 1 have been described above. Without the use of an additive, the plant centrifuge cake had a moisture content of about 10–15 percent, with the centrifuge turning out about 210 tons per day (TPD) of sesquicarbonate. This centrifuge production was only about one-third of the designed capacity, and the product had a higher moisture content than contemplated in the design calculations. See Figure 4 for crystal form.

EXAMPLE 9

The plant operation was modified by the introduction of dodecyl benzent sodium sulfonate just ahead of the cooling and crystallization step, at a concentration in the plant liquors of about 80 ppm. (active material). After operations had reached equilibrium conditions, the centrifuge cake moisture dropped to about 7 percent, with the centrifuge production increased to about 420 TPD. Further runs showed that production could be raised to 850 TPD, substantially exceeding the designed capacity of 650 TPD of sesquicarbonate.

EXAMPLE 10

Operation of the plant in a manner similar to that described in Example 9, but at an additive level of only 20 ppm. (active material), resulted in centrifuge cake moistures of about 6 percent, and a centrifuge production rate of about 500 TPD. Further runs showed that even at this additive level and moisture content a production rate of 850 TPD can be maintained.

EXAMPLE 11

Figure 5:
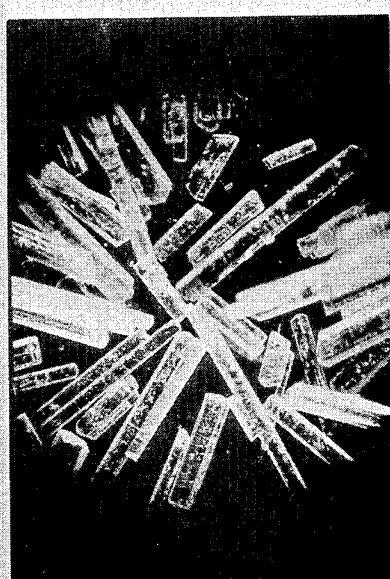
FIG. 5 shows the rod-like sodium sesquicarbonate crystals prepared on a plant scale with the use of 10 p.p.m. of dodecyl benzene sodium sulfonate at the same magnification.

A run similar to Example 10 was made at a level of 10 ppm. surfactant, giving excellent rod-like crystals, which as shown in Figure 5, have a length several times the greatest width.

EXAMPLE 12

Operation of the plant in a manner similar to that described in the two preceding examples, but at an additive level of only about 5 ppm. (active material), gave centrifuge cake moistures of about 9 percent and centrifuge capacities of about 850 TPD.

EXAMPLE 13

Using the surfactant of Example 6 in the plant at an active material concentration of 14 ppm. gave results very similar to those obtained in Example 11.

Nonionic, cationic-active, dyes and other types of additives were ineffective with sodium sesquicarbonate. It was found that increasing the scale of operations as in plant practice permitted the use of considerably lower concentrations of additive as compared with the concentrations necessary in the laboratory, without substantially affecting the numerous advantages realized from the practice of this invention, and in most cases actually giving superior results.

Plant operation, however, continued to be erratic. The plant would operate for several days or months producing crystals of soda ash, 80 to 90% of which had a particle size of +100 mesh and then the percentage of +100 mesh particles would drop to 60 to 70 percent and gradually climb back to 80 to 90% +100 mesh. We believe that this erratic operation was caused at times by variations in the calcium content of the process liquors at the point of crystallization as is shown by Table II herein.

In the process of dissolving raw crude trona and producing soda ash therefrom as described in said Pike U.S. Patent No. 2,639,217, and as described in connection with FIG. 1, calcium is introduced into the process liquors at two points. The insoluble fraction of the crude trona fed to the dissolvers contains appreciable quantities of such calcareous minerals as limestone and shortite ($Na_2CO_3 \cdot 2CaCO_3$) and the natural waters of the region, used as process and makeup water, have an average total hardness of about 270 ppm. calculated as calcium carbonate (of this amount, about 100 ppm. is present as magnesium carbonate, with the remainder calcium carbonate). The hardness of the water varies some with the season, being lowest in the spring, when thawing and spring rains may reduce the total hardness temporarily to about 230 ppm., the calcium dissolved from the trona is substantially uniform from day to day. If no attempt is made to reduce the calcium content of the process liquors and the hard water natural to the region is introduced directly into the process liquors without prior softening the calcium content of the soda ash will be from 250 to 375 ppm. which is far above that desired, and we also have found that the production of large size crystals of sodium sesquicarbonate according to this invention is seriously interfered with.

Whereas in plant operation it was possible to produce soda ash having over 80% +100 mesh particles and less than 100 ppm. of calcium therein, unexpected variations from this performance frequently occurred. If the calcium content of the process liquors was below about 30 ppm., the performance was good, but if this limit was materially exceeded the particle size of the soda ash would drop off, a more dusty ash was produced, the clear appearance of the sesquicarbonate crystals was changed to an opaque appearance and the calcium content of the soda ash increased many fold.

We have found that these difficulties can be substantially overcome by maintaining the calcium content of the process liquors below specified limits by introducing into the dissolving and crystallizing circuits only softened makeup water containing preferably less than 20 ppm. of Ca, so that when mixed with the recirculated mother liquor the calcium content of the process liquors going into the crystallizers is kept below about 30 ppm., preferably below 25 ppm. The range of Ca in the softened water should in all events be below 30 ppm. and the process liquors should have less than 40 ppm. Ca therein at the crystallization step.

The natural hard water of the region may be softened by any water softening process, such as the cold-lime soda process or the zeolite process, but we prefer to soften all the makeup water by thoroughly mixing the makeup water with concentrated slurry of the insoluble trona muds containing sufficient undissolved alkali value, to exchange sodium for most of the calcium in the water, and sufficient concentration of insolubles (mud) to flocculate and entrain most of the calcium carbonate formed by the ion exchange and carry it out of the process with the insoluble muds discharged to waste.

In order to soften the makeup water in this manner all the necessary makeup water, containing an average total hardness of about 85 ppm. (with seasonal variations up to 120 ppm.) calculated as calcium is first slurried with the muds discharged from clarifier 4. The muds have a solids concentration of 30 to 50% and an undissolved trona content of about 3%. The muds are thoroughly mixed with the makeup water in mixing tank 6 and are then passed to the center well of thickener 9 where the muds, carrying the precipitated calcium carbonate settle and are discharged to waste through the line extending from the bottom of the thickener and the clear overflow liquor, reduced in calcium hardness to about 16 ppm. flows through the line 9a to the recycle mother liquor line 23 where it is mixed with the recycle mother liquor in the ratio of about 1 part of softened makeup water to 18 parts of mother liquor.

The mother liquor returning from the settler 20 and centrifuges 21 contains about 24 ppm. of calcium hardness, and the calcium hardness of the makeup water (16 ppm. Ca) added to the mother liquor should be such that the total calcium hardness of the combined stream flowing into the dissolvers 1 is about 23 ppm.

In the dissolvers 1 calcium is dissolved but this amount appears to be somewhat constant. The ratio of calcium in the dissolver feed to the amount of calcium dissolved from the trona should be such that the calcium content of the feed to clarifier 4 is in the range of 20 to 40 ppm., preferably less than 30 ppm. The clarifier overflow, constituting the feed to the filters 13 and consequently to the crystallizers 16, 17 and 18 should contain preferably not more than 30 ppm. of calcium and preferably of the order of 20 to 25 ppm. calcium in order not to interfere with the operation of the crystallization additives as described herein and in order to keep the calcium content of the final soda ash within specification limits and preferably below 100 ppm.

Typical calcium levels through the process operating according to our invention is as follows:

Table I

Sample:                                              Calcium (Ca)
                                                     content, ppm.
Mixing tank makeup water_____ 85
Thickener overflow_____ 16
Dissolver feed liquor (mother liquor combined
  with makeup water)_____ 23
Dissolver overflow_____ 30
Crystallizer feed liquor_____ 28
Crystal settler overflow and centrifuge filtrate___ 24
Light soda ash_____ 100

These limits can, of course, be varied some and will vary some in operation, but represent desirable limits of calcium content which can be maintained by softening the makeup water to around 10 to 20 ppm. calcium hardness and controlling the ratio of makeup water to mother liquor to maintain the calcium balance substantially as indicated.

In order to illustrate the effect of the calcium content of the crystallizer feed liquors on the effectiveness of the crystallization additives described above a plant filtrate (crystallizer feed liquor) reduced in calcium content to about 11 p.p.m. was crystallized with 100 p.p.m. of the same crystallization additive, dodecyl benzene sodium sulfonate, as used in Examples 9, 10, 11 and 12, and similar crystallizations were made with increasing concentrations of calcium in the crystallizer feed. The results were as follows:

Table II

|  | Sesquicarbonate Crystals | | Ca Content of Soda Ash, p.p.m. |
|---|---|---|---|
|  | +60 mesh, percent | +100 mesh, percent |  |
| (1) Plant crystallizer feed liquor containing 11 p.p.m. Ca | 40.7 | 73.0 | 157 |
| (2) Plant crystallizer feed liquor containing 29 p.p.m. Ca | 48.9 | 77.5 | 221 |
| (3) Plant crystallizer feed liquor containing 34 p.p.m. Ca | 14.7 | 35.0 | 293 |
| (4) Plant crystallizer feed liquor containing 39 p.p.m. Ca | 38.6 | 64.2 | 389 |
| (5) Plant crystallizer feed liquor containing 54 p.p.m. Ca | 32.9 | 56.7 | 800 |
| (6) Plant crystallizer feed liquor containing 61 p.p.m. Ca | 24.3 | 47.8 | 829 |
| (7) Plant crystallizer feed liquor containing 79 p.p.m. Ca | 33.5 | 54.9 | 984 |
| (8) Plant crystallizer feed liquor containing 111 p.p.m. Ca | 30.3 | 53.2 | 1,080 |
| (9) Plant crystallizer feed liquor containing 211 p.p.m. Ca | 35.0 | 54.6 | 1,800 |

As is shown by the above table, at about 40 p.p.m. calcium in the crystallizer feed liquor, the particle size of the sodium sesquicarbonate crystals crystallized in the presence of an anionic active surfactant crystal modifier drops rapidly from in excess of 70% +100 mesh to below 50% +100 mesh when 61 p.p.m. Ca is present in the solution, and the calcium contamination of the soda ash rises rapidly. The accumulation of calcium scale in various parts of the plant also increases with increase of calcium in the process liquors. The particle size of the soda ash produced from the sesquicarbonate crystals parallels the particle size of the sesquicarbonate crystals.

In plant practice even better results are obtained, as more than 80% +100 mesh particles of soda ash containing less than 100 p.p.m. of calcium can be regularly produced with a lesser amount of the surfactant when the calcium content of the crystallizer feed liquor is kept below about 30 p.p.m.

In a similar test a synthetic solution of sodium sesquicarbonate similar in composition to the plant crystallizer feed liquor was prepared from reagent grade materials using distilled water and dissolving sodium carbonate and sodium bicarbonate therein. The synthetic solution contained 16 p.p.m. of calcium, due to the calcium content of the sodium carbonate and sodium bicarbonate dissolved therein. Dodecyl benzene sodium sulfate in the amount of 100 p.p.m. was added to this solution. Different amounts of calcium were added and crystallizations of sodium sesquicarbonate from this solution were carried out with the following results:

Table III

|  | Sesquicarbonate Crystals | | Ca Content of Soda Ash |
|---|---|---|---|
|  | +60 mesh, percent | +100 mesh, percent |  |
| Synthetic crystallizer liquor containing 16 p.p.m. Ca | 58.9 | 75.9 | 286 |
| Synthetic crystallizer liquor containing 66 p.p.m. Ca | 24.9 | 50.9 | 993 |
| Synthetic crystallizer liquor containing 116 p.p.m. Ca | 30.0 | 54.0 | 1,120 |
| Synthetic crystallizer liquor containing 216 p.p.m. Ca | 35.4 | 64.6 | 1,170 |

The results of these tests substantially parallel the results of Table II and show that at some point between 16 p.p.m. Ca and 66 p.p.m. Ca the particle size of the sodium sesquicarbonate crystals, crystallized in the presence of an anionic-active surfactant crystal modifier, drops rapidly from in excess of 75% +100 mesh to substantially 50% +100 mesh particles, and the calcium contamination of the soda ash rises rapidly.

In a plant using 200 gallons per minute of makeup water, without softening, approximately 400 pounds per day of calcium carbonate will be introduced into the system every day, which will influence the crystal size detrimentally as shown in Table II and most of which will appear as calcium contamination in the final product and calcium scale in the process lines, tanks, etc. By reducing the calcium content of the makeup water to about one-fourth of the calcium content of the natural waters by treating it with the thickened trona muds, and maintaining the calcium content in the crystallizer feed liquid below 40 p.p.m., preferably 30 p.p.m., the detrimental effect on the final product is largely overcome and the sodium values in the trona muds are recovered. While it would be preferable to soften the makeup water to zero hardness by the use of zeolitic or resin type water softeners, these processes would be more expensive and would not recover the sodium values in the trona muds. While we have referred to the reduction of the calcium content of the natural waters as "softening," the object of our process is to control the calcium content of our process solutions and the products produced therefrom rather than to merely soften the natural waters.

It should be understood that the foregoing descriptive and illustrative materials represent only typical embodiments of the invention, and are not to be construed as limiting the scope thereof, as defined by the claims which follow.

We claim:

1. A process for preparing crystals of sodium sesquicarbonate from crude Green River, Wyoming trona, which crystals are improved in size, clarity, dewaterability and settling rate, which comprises softening the natural hard water of the region, containing an average total hardness of about 85 to 120 ppm. calculated as calcium to a calcium hardness of less than 30 ppm. to provide make-up water for said process, adding said make-up water softened to a calcium hardness of less than 30 ppm. calculated as calcium to a recycling mother liquor containing primarily water and dissolved sodium carbonate and sodium bicarbonate to provide a dissolver feed solution having less than 30 ppm. calcium hardness, dissolving said crude trona in said recycling mother liquor to provide a dissolver discharge solution having less than 40 ppm. calcium hardness, clarifying said solution to remove insolubles therefrom and provide a crystallizer feed liquor, maintaining a calcium concentration in said crystallizer feed liquor of less than 40 ppm., adding an anionic-active surfactant crystallization modifier to said solution in the amount of about 5 to about 100 ppm., precipitating and removing sodium sesquicarbonate crystals from said solution and recycling the mother liquor from the crystal removal step to dissolve more trona.

2. A process for preparing crystals of sodium sesquicarbonate from crude Green River, Wyoming trona containing calcium therein, which crystals are improved in size, clarity, dewaterability and settling rate, which comprises softening the natural hard water of the region, containing an average total hardness of about 85 to 120 ppm. calculated as calcium to a calcium hardness of less than 20 ppm. to provide make-up water for said process, adding said make-up water softened to a calcium hardness of less than 20 ppm. calculated as calcium to a recycling mother liquor containing primarily water and dissolved sodium carbonate and sodium bicarbonate in such amount as to provide a dissolver feed solution having less than 25 ppm. calcium hardness, dissolving said crude trona in said recycling mother liquor to provide a dissolver discharge solution having less than 30 ppm. calcium hardness, clarifying said solution to remove insolubles therefrom and provide a clarified crystallizer feed liquor, settling and removing said insolubles from said crystallizer feed liquor and slurrying the insolubles with hard natural water to dissolve further sodium values therefrom and soften said hard natural water to a calcium hardness of less than 20 ppm., maintaining a calcium concentration in the clarified crystallizer feed liquor of less than 30 ppm., adding an anionic-active surfactant to said clarified solution in the amount of about 5 to about 100 ppm., crystallizing, precipitating and removing sodium sesquicarbonate crystals from said solution, recycling the mother liquor from the crystal removal step to dissolve more trona, separating the softened water from the trona insolubles and adding said softened water as make-up water to the recycling mother liquor.

3. A process for preparing crystals of sodium sesquicarbonate from Wyoming trona which crystals are improved in size, dewaterability and settling rate, which comprises softening the natural hard water of the region containing an average total hardness of 85 to 120 ppm. calculated as calcium to a calcium hardness of less than 30 ppm. to provide make-up water for said process, forming a plant dissolver solution by adding said softened make-up water to a recycling mother liquor containing primarily water and dissolved sodium carbonate and sodium bicarbonate to provide an aqueous solution containing less than 30 ppm. of calcium therein, dissolving crude trona in said solution to form a crystallizer solution, maintaining a calcium concentration of less than 40 ppm. in said crystallizer feed solution, crystallizing and precipitating sodium sesquicarbonate from said solution by effecting the crystallization and precipitation of said salt from said solution in the presence of about 5 to about 100 ppm. of an anionic-active surfactant agent selected from the group consisting of (1) alkyl benzene sulfonates containing at least 8 alkyl carbon atoms, (2) alkyl naphthalene sulfonates containing at least 4 alkyl carbon atoms, (3) primary alkyl alcohol sulfonates containing at least 10 carbon atoms, (4) N-substituted taurines of the formula R′R″NCH$_2$CH$_2$SO$_3$M where R′ is a hydrocarbon radical, R″ is the acyl radical of a higher fatty acid and M is an alkali metal, separating the sodium sesquicarbonate crystals from said solution and recycling the mother liquor to dissolve more trona.

4. A process for preparing crystals of sodium sesquicarbonate from crude Green River, Wyoming trona, which comprises softening the natural hard water of the region containing an average total hardness of about 85 to 120 ppm. calculated as calcium to a calcium hardness of less than 20 ppm. to provide make-up water for said process, adding said make-up water softened to a calcium hardness of less than 20 ppm. as calcium to a recycling mother liquor containing primarily water and dissolved sodium carbonate and sodium bicarbonate to provide a dissolver feed solution having less than 25 ppm. calcium hardness, dissolving said crude trona in said recycling mother liquor to provide a dissolver discharge solution having less than 30 ppm. calcium hardness, clarifying said solution to remove insolubles therefrom and provide a crystallizer feed solution, settling and removing said insolubles and slurrying the insolubles with hard natural water to dissolve further sodium values therefrom and soften said hard natural water to a calcium hardness of less than 20 ppm. maintaining a calcium concentration of less than 30 ppm. in the clarified crystallizer feed solution, adding an anionic active surfactant crystallization modifier to said solution, crystallizing, precipitating and removing sodium sesquicarbonate crystals of low calcium content from said solution, recycling the mother liquor from the crystallization step to dissolve more trona, separating the softened water from the trona insolubles and adding said softened water as make-up water to the recycling mother liquor.

5. The process of claim 4 wherein the salt being crystallized is sodium sesquicarbonate and the surfactant is present in the aqueous solution prior to crystallization in a concentration of from about 5 to about 20 ppm. active material and the calcium content of the crystallizing solution is less than 30 ppm.

6. The process of claim 4 wherein the surfactant is an alkyl benzene sulfonate containing at least 8 carbon atoms.

7. The process of claim 4 wherein the surfactant is an alkyl naphthalene sulfonate containing at least 4 alkyl carbon atoms.

8. The process of claim 4 wherein the surfactant is a primary alcohol sulfate containing at least 10 carbon atoms.

9. The process of claim 4 wherein the surfactant is an N-substituted taurine of the formula

R′R″NCH$_2$CH$_2$SO$_3$M where R′ is a hydrocarbon radical, R″ is the acyl radical of a higher fatty acid and M is an alkali metal.

References Cited by the Examiner

UNITED STATES PATENTS

| | | | |
|---|---|---|---|
| 1,766,705 | 6/1930 | Dehnel | 23—64 |
| 2,155,477 | 4/1939 | Drujon | 23—64 |
| 2,346,140 | 4/1944 | Pike | 23—63 X |
| 2,591,704 | 4/1952 | King | 23—300 X |
| 2,595,238 | 5/1952 | Frejacques | 23—300 X |
| 2,607,660 | 8/1952 | Robertson | 23—64 |
| 2,639,217 | 5/1953 | Pike | 23—63 |
| 2,670,269 | 2/1954 | Rahn | 23—63 |
| 2,704,239 | 3/1955 | Pike | 23—63 X |
| 2,720,446 | 10/1955 | Whetstone | 23—300 X |
| 2,780,520 | 2/1957 | Pike | 23—63 |
| 2,954,282 | 9/1960 | Bauer et al. | 23—300 |

OTHER REFERENCES

Perry et al.: "Surface Active Agents," publ. by Interscience Publ., N.Y., 1949, p. 102.

NORMAN YUDKOFF, *Primary Examiner.*

ANTHONY SCIAMANA, MAURICE BRINDISI,
*Examiners.*